No. 644,849. Patented Mar. 6, 1900.
T. W. CROZIER.
NUT LOCK.
(Application filed Mar. 1, 1899.)
(No Model.)
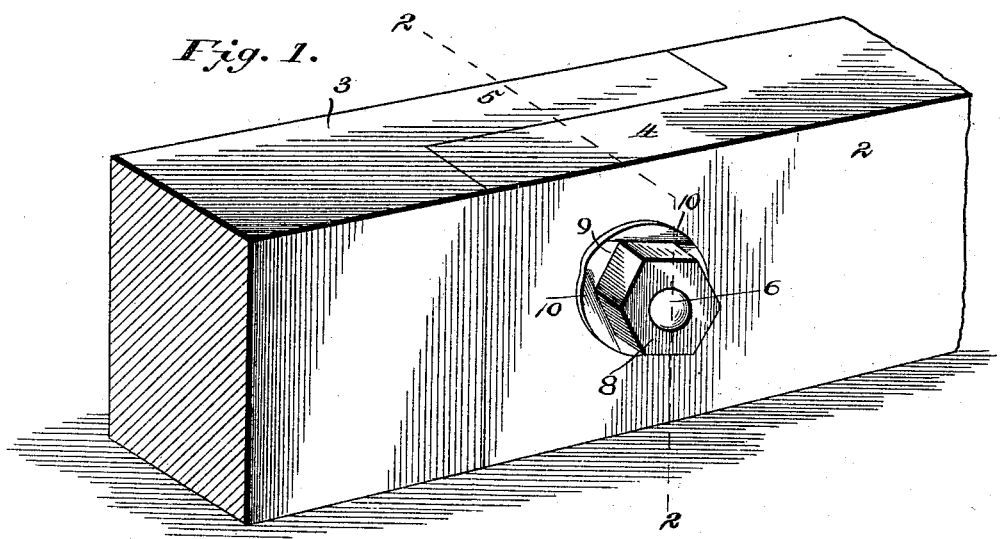
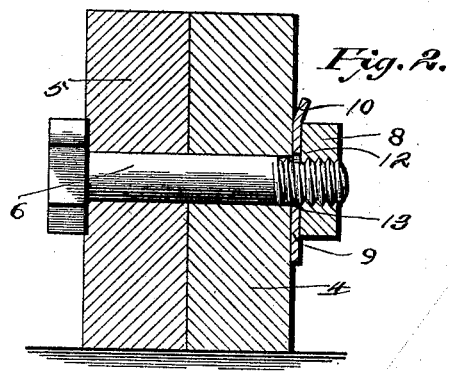
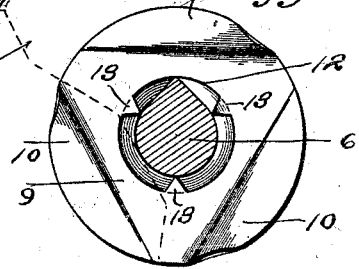
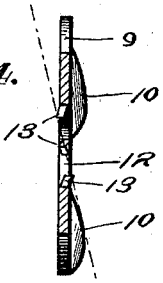
Witnesses
Clarence H. Walker.
Heath Sutherland
Thomas W. Crozier, Inventor
By his Attorneys,
C. A. Snow & Co.
THE NORRIS PETERS CO., PHOTO-LITHO., WASHINGTON, D. C.

UNITED STATES PATENT OFFICE.

THOMAS WASHINGTON CROZIER, OF ROANOKE, VIRGINIA.

NUT-LOCK.

SPECIFICATION forming part of Letters Patent No. 644,849, dated March 6, 1900.

Application filed March 1, 1899. Serial No. 707,253. (No model.)

*To all whom it may concern:*

Be it known that I, THOMAS WASHINGTON CROZIER, a citizen of the United States, residing at Roanoke, in the county of Roanoke and State of Virginia, have invented a new and useful Nut-Lock, of which the following is a specification.

This invention relates to nut-locks; and the object thereof is to provide a simple and efficient device of this character in which the nut will be firmly held on the bolt against retractive rotation caused by vibration and shock to which the bolt may be subjected.

My improved nut-lock is in the form of a washer having a flat body portion with nut-engaging means and a plurality of prongs extending inward into the bolt-opening, with their points arranged in a common plane, which plane is at an angle to the plane of the washer-body.

The invention consists of other peculiarities of construction and disposition of parts, which will be hereinafter fully described and claimed.

In the drawings accompanying and forming a part of this specification, Figure 1 is a perspective view of a device provided with my improved nut-lock. Fig. 2 is a transverse section of the same, taken in the line 2 2 of Fig. 1. Fig. 3 is an enlarged detail of the washer and bolt, showing the spurs or prongs on the washer embedded in the thread of the bolt. Fig. 4 is a sectional elevation of the washer, the section being taken in the line 4 4 of Fig. 3 and showing by dotted lines the spur-points touching a pitch-line conforming to that of the thread of the bolt.

Similar characters designate like parts in all the figures of the drawings.

The ends or abutting portions of two overlapping plates are shown at 2 and 3, respectively, (see Figs. 1 and 2,) and the locking-bolt 6 extends through alined apertures formed in the overlapping portions or tongues 4 and 5 of said plates, this being a common form of joint and being illustrated simply to show the nature of the invention. The nut-lock, of course, can be used to hold any two members in assembled relation.

The nut is designated by 8, and it is held in a fixed position adjacent to the plate 2 by a locking-washer 9, said washer being stamped and completed for use at one operation from, preferably, resilient sheet metal, and is bent or deflected on straight lines tangentially near its outer edge to provide a series of projections, as 10, located at suitable intervals apart and offset from the body thereof to form at intervals yielding spring-shoulders, which serve to engage the outer edges of the nut, as indicated in Fig. 1, thereby to maintain said nut in proper position and prevent relative rotative movement between the nut and washer. The projections all extend from the same side of the washer and are gradually inclined from one end to the other, the lowest point of one projection being adjacent to the highest point of the other, the portion of the washer between the projections being flat, so as to lie flat against the object. The locking-washer has a substantially-central aperture or opening 12 to receive the bolt 6 and is equipped with a series of spurs or prongs 13, having sharpened or pointed ends which are adapted to be forced transversely or crosswise through the thread of the bolt by the operation of the nut as the latter is turned on the bolt, and the points of the spurs or prongs, as will be evident from an inspection of Fig. 3, touch a circle bounded by the periphery of the bolt-body, by reason of which they can be thrust into the thread of the bolt by the advancing nut, and as a means for facilitating the introduction of the washer the points of the spurs touch a pitch-line (see dotted line, Fig. 4) conforming to that of the thread of the bolt, so that said prongs can be successively inserted in the front end of the groove between the thread, whereby when the washer is turned in the proper direction it can be led onto or off from the bolt-thread with a screw-like action. Ordinarily the washer and the nut will be simultaneously turned onto the bolt-thread, the washer being in front, and these parts may be moved in unison until the washer abuts against the plate 2 or other part, at which time the further turning of the nut will immediately force the spurs into and across the thread. When the prongs are embedded sufficiently into the thread of the bolt, the further turning of the nut will be stopped, and it will be evident that the locking projections 10, by engaging the outer edges of the nut, will prevent retraction of the latter, and as the washer is locked firmly against turning movement relatively to the bolt it will be evident that said nut cannot be shaken off or dislodged by jars or shocks.

It will be evident from the preceding description that my improved device includes, broadly, a bolt, a nut on the bolt, and a locking-washer adjacent to the nut and provided with a series of spurs forcible into the thread of the bolt transversely or crosswise of said thread by the nut without changing the relative disposition of said spurs.

Changes in the form, proportion, size, and the minor details of construction within the scope of the appended claims may be resorted to without departing from the spirit or sacrificing any of the advantages of this invention.

Having thus described the invention, what I claim is—

1. A nut-lock consisting of a circular spring-metal washer provided with a bolt-opening, and having portions around its outer edge permanently bent or deflected on straight lines tangentially to form laterally-offset spring projections or shoulders for yieldingly engaging the sides of a nut, the projections or shoulders extending from the same side of the washer and each projection or shoulder having a gradual inclination from one end to the other, the portion of the washer between the shoulders lying flat against the object to which the nut-lock is applied, substantially as described.

2. A lock-nut in the form of a washer having a flat body portion with nut-engaging means, and a plurality of prongs extending inward into the bolt-opening with their points arranged in a common plane, which plane is at an angle to the plane of the washer-body.

3. The combination with a threaded bolt and nut, of a locking-washer having a flat body portion with nut-engaging means, and inwardly-projecting prongs for engaging the bolt-threads, the points of said prongs being arranged in a common plane which corresponds to the pitch of the bolt-thread, the prongs being adapted under pressure to be forced laterally into the bolt-threads, substantially as described.

In testimony that I claim the foregoing as my own I have hereto affixed my signature in the presence of two witnesses.

THOMAS WASHINGTON CROZIER.

Witnesses:
C. C. TALIAFERRO,
WM. M. DUNLOP.